United States Patent [19]
Wehhofer et al.

[11] Patent Number: 5,665,941
[45] Date of Patent: Sep. 9, 1997

[54] METHOD AND APPARATUS FOR FILTERING OUT SIGNAL COMPONENTS FROM OUTPUT SIGNALS OF A DIFFERENTIAL DOSING SCALE USING A FUZZY LOGIC FILTER

[75] Inventors: Josef Wehhofer; Hans Werner; Volker Tews, all of Darmstadt, Germany

[73] Assignee: Carl Schenck AG, Darmstadt, Germany

[21] Appl. No.: 210,894

[22] Filed: Mar. 18, 1994

[30] Foreign Application Priority Data

Mar. 22, 1993 [DE] Germany .................. 43 09 109.1

[51] Int. Cl.$^6$ .................. G01G 13/24; G01G 11/08
[52] U.S. Cl. .................. 177/25.13; 177/25.19; 177/59; 177/116; 222/55; 364/148; 395/900
[58] Field of Search .................. 177/1, 25.11, 25.12, 177/25.13, 59, 116, 121, 25.19; 364/567, 148, 149, 150, 151, 152, 153, 154, 155, 156, 157, 158, 159, 160, 161, 162, 163, 164, 165; 395/3, 900; 222/55, 63, 77

[56] References Cited

U.S. PATENT DOCUMENTS

| | | | |
|---|---|---|---|
| 3,767,900 | 10/1973 | Chao et al. | 364/151 |
| 4,762,252 | 8/1988 | Hyer et al. | 222/63 X |
| 4,880,142 | 11/1989 | Higuchi et al. | 222/63 X |
| 4,976,377 | 12/1990 | Higuchi et al. | 222/55 |
| 4,977,526 | 12/1990 | Jost et al. | 364/567 |
| 5,043,862 | 8/1991 | Takahashi et al. | 364/162 |
| 5,132,897 | 7/1992 | Allenberg | 364/149 |
| 5,272,621 | 12/1993 | Aoki | 364/165 |

FOREIGN PATENT DOCUMENTS

| | | |
|---|---|---|
| 0290999 | 11/1988 | European Pat. Off. . |
| 0289048 | 11/1988 | European Pat. Off. . |
| WO91/06835 | 5/1991 | European Pat. Off. . |
| 0291553 | 7/1991 | European Pat. Off. . |
| 3926038 | 6/1990 | Germany . |

OTHER PUBLICATIONS

Automation Concepts based on Fuzzy Control and Classical Control Theory; by Schreiber et al.; pp. 349 to 354.
Application of fuzzy algorithms for control of simple dynamic plant, by E. H. Mamdani, Proc. IEE,vol. 121, No. 12 Dec. 1974, pp. 1585–1588.

Primary Examiner—Michael L. Gellner
Assistant Examiner—Randy W. Gibson
Attorney, Agent, or Firm—W G. Fasse; W. F. Fasse

[57] ABSTRACT

The accuracy of the output feed rate or output feed quantity of a differential dosing scale is increased by eliminating from the respective feed rate signal or output quantity signal measuring disturbance that can adversely influence the output accuracy. For this purpose, the size of the output signal variations or of the feed rate variations are processed in a fuzzy logic circuit (9) which allocates the respective signals to fuzzy sets, e.g. "small", "medium", "large" in accordance with type and size of the disturbance or interference. The fuzzy logic circuit (9) forms a filter control signal that corresponds to a filtering degree or filter factor. The filtering control signal controls the time constant of a time variable filter (6) through which the differentiated signal coming from the dosing scale load cells is passed prior to processing in the fuzzy logic circuit (9).

14 Claims, 5 Drawing Sheets

METHOD AND APPARATUS FOR FILTERING OUT SIGNAL COMPONENTS FROM OUTPUT SIGNALS OF A DIFFERENTIAL DOSING SCALE USING A FUZZY LOGIC FILTER

FIELD OF THE INVENTION

The invention relates to a method and apparatus for filtering or screening out interfering signals from weight representing output signals generated by the load cells in a bulk material weighing differential dosing scale. These interfering signals could falsify the weight representing output signals. Such adverse influences on the weighing results are to be avoided.

BACKGROUND INFORMATION

In a differential dosing scale a continuously operating discharge conveyor discharges a defined dosage or material quantity from the dosing scale, also referred to herein as "weigher". The material quantity or dosage per unit of time which is continuously discharged by a feeder device from a container of the weigher is determined by deriving the measured values of the total weight with respect to time. However, the respective signal or value that constitutes the weight rate comprises in addition to the actual weight rate signal component a number of signal components that are caused by interfering or disturbing influences. For example, a nonhomogeneous bulk material flow or a nonlinear response characteristic of the feeder device can cause output disturbances which must be sensed or measured and indicated or these signal components must be eliminated by a closed loop control to avoid falsifying the measured result.

Incidentally, in this disclosure the terms signal or signals are used as synonymous terms for value or values.

In addition to the above mentioned interfering signal components there is another group of interferences or disturbances which may have an adverse effect on the measured weight signal, however which does not cause variations in the output material flow rate. This other group of interferences are referred to herein as pure measuring interferences and include, for example, vibrations in the building where the weigher is located. Such vibrations are frequently caused by heavy trucks or trains passing by the building. Further, to this group of pure measuring interferences also belong interferences caused by an object inadvertently deposited on the weigher, contact of the weigher container by an operator, and similar influences. Even wind influences to which the weigher container may be exposed can cause these pure measuring interferences. These pure measuring interferences adversely affect the measured weight signal even if they do not vary the output flow. Differential dosage scales usually must meet very high precision requirements in industrial processes. Thus, it is necessary that these pure measuring interferences are differentiated from other interferences that vary the material flow. Further, signals representing these pure measuring interferences must be screened out or filtered out from the display of the dosage values and, if applicable, from a closed loop control circuit of the bulk material feeder device forming part of the weigher.

Two kinds of interferences occur, both of which affect the measured signal $W(t)$ and as a consequence also the time $W'(t)$ derivative (feed rate). Feed rate interference $z_A(t)$ are actual interferences in the feed rate $A(t)$, which have to be corrected by the controller. Pure measurement interferences $z_M(t)$ occur only in the measured value $W(t)$ and not in the feed rate. The controller must not react to such interferences, in order not to corrupt the actual feed rate $A(t)$. The totalized amount of material discharged by the distribution means $M_{total}$ is obtained by integrating the measured feed rate $W'(t)$. Actual variations of the rate $A(t)$ caused by interferences $z_A(t)$ have to be accounted for during the calculation of the totalized amount. Pure measurement interference $z_M(t)$, however, would corrupt the determination of the totalized amount and have to be eliminated.

European Patent Publication EPO 291,553 and U.S. Pat. No. 4,977,526 (Jost et al.), issued on Dec. 11, 1990, disclose a method for screening out interfering signals occurring in a differential dosing scale. The known method operates by producing estimated values for the future based on values measured in the past. For this purpose, the weight signal is sampled at short time intervals on a continuous basis. The sampled signals are supplied to an evaluating circuit which calculates the difference between the instantaneously measured weight signal and the previously ascertained estimated value.

If the difference between the estimated value and the actually measured weight value exceeds a fixed tolerance range or threshold, a pure measuring interference is ascertained and the estimated value is used as the basis of a closed loop control. Additionally, the estimated value is also displayed so that an operator may take notice. In the known method of filtering or screening out interferences only those pure measuring interferences are ascertained which exceed the threshold value or tolerance range between the estimated value and the respective measured weight value. However, in the known method interferences that are within the tolerance range or which establish themselves slowly in time, are not ascertained. As a result, such falsifying disturbances or interferences are not screened out. Due to the fixed threshold, the known method has little flexibility.

OBJECTS OF THE INVENTION

In view of the above it is the aim of the invention to achieve the following objects singly or in combination:

- to improve a method and circuit arrangement for filtering out from the measured output signals of a differential dosing scale, interfering or disturbing signal components which adversely influence the weighing result without such filtering;
- to increase the dosing precision by taking into account interferences and disturbances which are slow to establish themselves or which are within the above mentioned tolerance range so that even these disturbances are filtered out and thus prevented from adversely affecting the weighing results;
- to screen out the above mentioned adverse or interfering signals by the application of the rules of fuzzy logic calculations, referred to herein as fuzzy rules;
- to control the filter by a filtering control signal that is time variable, thereby representing the degree of filtering needed at any one instant whereby the time variable filtering characteristics is controlled by an output signal from a fuzzy logic circuit which produces this filter control signal as a "filtering degree" in response to measured weight output signals;
- to construct a signal evaluation unit in such a way that both kinds of interferences namely feed rate interferences $z_A(t)$ and pure measurement interference $z_M(t)$ are distinguished;
- to take only feed rate interferences $z_A(t)$ into account for a corrected estimation of the feed rate $W''(t)$ for a controller and totalizing counter;

to make sure that a high distribution accuracy must not be adversely affected; and to avoid misinterpreting set point changes as interferences, where the circuit arrangement includes a closed loop control circuit.

SUMMARY OF THE INVENTION

The above objects of the invention have been achieved according to the present method by allocating in accordance with fuzzy logic rules, the size and type of measured variations in measured weight output signals of a differential dosing scale to respective fuzzy logic sets, and producing from these fuzzy logic sets a respective filter control signal that is used for screening out the disturbance or interference from the measured weight output signals. The term "measured weight output signals" includes weight signals as measured by load cells that are part of the differential dosing scale and feed rate signals that are weight signals after differentiation over time. The filter control signal defines a "filtering degree" of a filter (6) in the sense that the filter control signal determines how much of a measured weight signal or feed rate signal or what components of such signals will be screened out by the filter that has a controllable variable time response characteristic. The filter control signal is time variable, whereby a final weight or feed rate representing signal is produced that is free of the disturbing or interfering proportion or component of the initial measured weight output signal. The final weight representing signal corresponds to or represents a feeder or scale output in the form of dosed weights. The degree or extent of variations in the filter control signal will vary in accordance with the type and size of the disturbance or interference to be eliminated.

The apparatus of the invention for performing the present method comprises a differential dosing scale or weigher including a bulk material supply container with a dosing device in the form of a feeder and a feeder drive motor for conveying flowable bulk material. The supply container with its dosing device is supported by load cells for measuring scale weight output signals representing measured gross weight values that include the weight of the scale. The weight output signals of the load cells are supplied to an evaluating circuit including a differentiating circuit for ascertaining feed rate signals representing net weight or rather feed rate values that exclude the weight of the scale. The evaluating circuit further includes a time variable filter for producing a prognosis value or signal and an estimated value or signal. The time variable filter has a controllable variable time response characteristic. A prognosis value is a future estimate value. An estimated value refers to a current estimate value. A first comparator circuit has two inputs, one of which is connected to one output of the filter to receive the prognosis signal and the other input of the first comparator is connected to the output of the differentiating circuit to receive current net weight value signals at times when the load cell outputs of the load cells are sampled or scanned. The evaluating circuit further comprises a fuzzy logic circuit which receives difference output values from the first comparator to produce a fuzzy logic allocation in accordance with the fuzzy logic rules of the difference output values with reference to the type and size of any interference signal component, and to produce from such allocation the above mentioned filter control signal that represents said filter degree. The filter control signal is provided at an output of the fuzzy logic circuit and supplied to a control input of the time variable filter for controlling the variable time response characteristic of the filter. As a result, the filter produces an estimated value that constitutes a corrected feed rate signal from which any measurement interfering components or proportions have been filtered out or screened out.

The invention has the advantage that especially small interferences or disturbances that adversely affect the accuracy of the measurement are filtered out or screened out from the output weight signals of a differential dosing scale. This is especially an advantage because, as mentioned above, even relatively small air flows or vibrations of the foundation can be registered by sensitive weighing systems, whereby otherwise faulty net weight information would be provided. The invention eliminates this problem. Without the elimination of such small interfering or disturbing influences, sensitive weighing systems for high accuracy weighing can no longer meet regulations requiring certain degrees of precision weighing.

According to the invention it is thus possible to filter out even small variations in the weigher or feeder measured output signal representing net weight values that exclude the above mentioned interferences including small interferences not corrected heretofore. This elimination of even small interferences is made possible by the application of the fuzzy logic principles which as such are known.

Accordingly to the invention the ascertained signal can be displayed, enabling an operator to make a correction, or it is also possible in a simple manner to take the adverse interferences that falsify the measurement into account by comparing in a second comparator an estimated value with a rated value to thereby produce a closed loop control signal for the drive of the feeder or conveyor that forms part of the scale. One input of the second comparator is connected to an output of the time variable filter that provides the estimated value and the other input of the second comparator is connected to receive a rated value or reference value from a respective signal generator to produce the closed loop control signal for the feeder motor, whereby simultaneously a rated value variation may be incorporated into the closed loop control signal. For this purpose, the fuzzy logic circuit is so tuned to the closed loop control that within the range of rated value variations only that portion of a signal or value is evaluated as a measuring disturbance that exceeds the rated value variation range or limit and thus is eliminated or filtered out in accordance with the fuzzy logic rules.

Another advantage of the invention is seen in that especially with regard to small interferences that falsify the weight or net weight values, it is now possible to make a fuzzy prognosis from the development of the variations over time with regard to the type and size of a possible measurement interference in accordance with the fuzzy logic rules to thereby provide an information regarding an interference probability.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
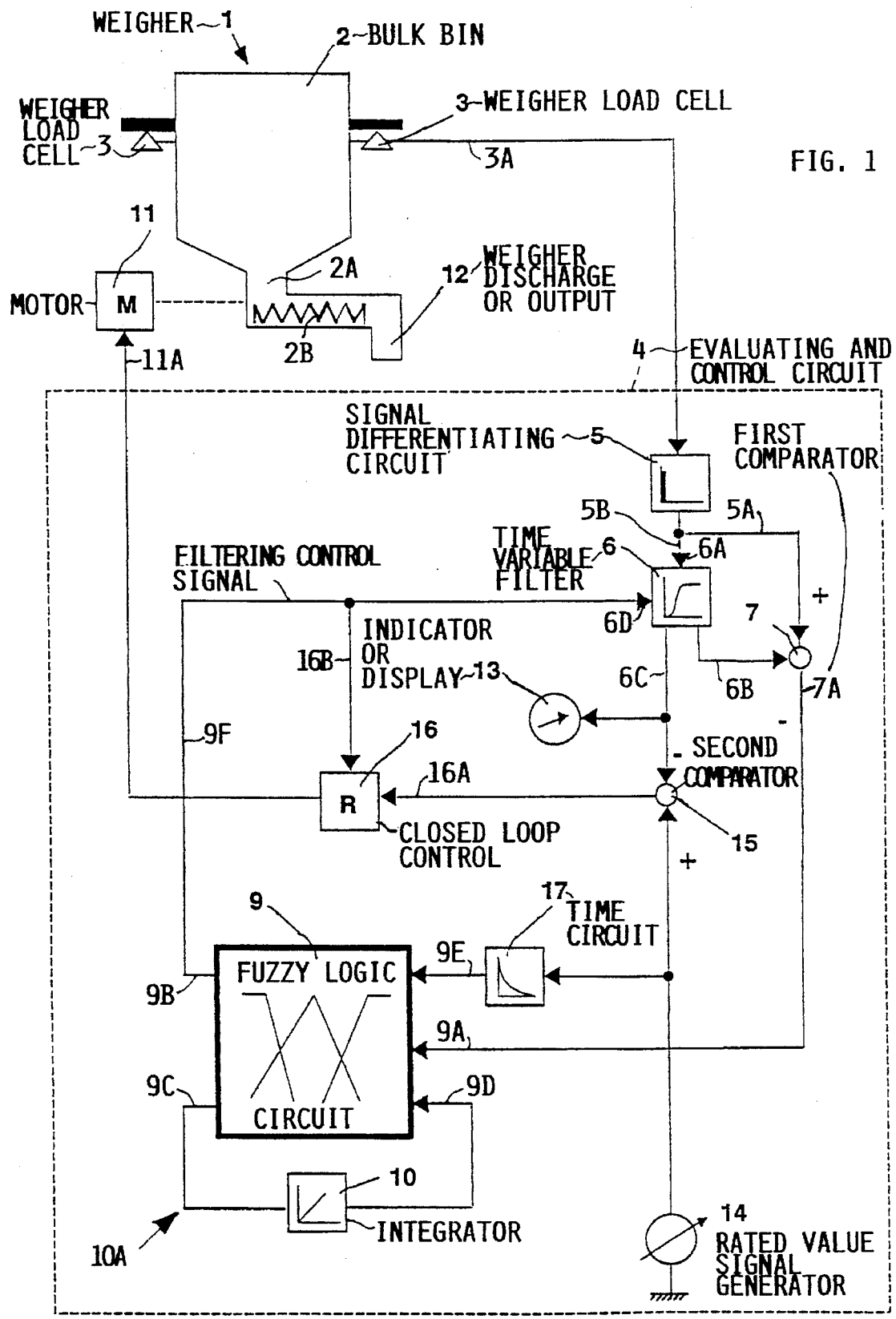
FIG. 1 shows schematically a bulk flow measuring scale combined with a signal evaluating circuit that includes a fuzzy logic circuit.

Referring to FIG. 1, the present weighing system comprises a weigher 1 including a bulk bin 2 supported on weigher load cells 3 that provide a gross weight signal on a conductor 3A that carries scale, or measured gross weight output signals. The bulk bin 2 has a lower bin opening 2A leading into a conveyor or feeder 2B, such as a screw conveyor for discharging measured quantities of bulk material through a discharge output 12. The screw conveyor is driven by a motor 11. The just described components form a differential dosing scale.

According to one embodiment of the invention shown in FIG. 1 a signal evaluating and control circuit 4 is connected with its input to the gross weight signal conductor 3A and with its output to a control input 11A of the drive motor 11 to provide a closed loop feedback control for the motor 11. In another embodiment shown in FIG. 2 the feedback control is omitted and only an indication of a filter output is provided. Hence, the evaluating and control circuit 4 functions in two ways. On the one hand, the circuit 4 provides a display that shows, for example in an indicator 13, the current feed rate value of the dosing scale 1 as corrected according to the invention by the fuzzy logic rules applied by a fuzzy logic circuit 9 to be described below. On the other hand, the circuit 4 provides a closed loop feedback control circuit for the drive motor 11 whereby the motor is controlled so that the material output corresponds to a predetermined, rated feed value which may also be indicated by the indicator 13 and which, in both instances, has been corrected by the fuzzy logic rules.

The just described weighing system with the weigher 1 and its components, and with the evaluating and control circuit 4, is used for the continuous dosing of bulk materials or other flowable additives that require for their measurement a differential dosing scale in industrial processes. Although the conveyor 2B is shown as a screw conveyor, other conveyors may be employed, for example, vibratory conveyors or belt conveyors. The measured weight output signal produced by the weigher load cells 3 and supplied through the output conductor 3A varies in accordance with the material discharge flow from the discharge or output 12.

In order to produce the feed rate, the first component of the evaluating and control circuit 4 is a signal derivating circuit 5 that receives at its input the gross measured weight output signal and produces at its output the feed rate signal by derivating the gross weight signal of the weigher 1 with respect to time. The known feed rate is stored in a memory of the signal differentiating circuit 5. Over time the differentiating circuit produces a net feed rate value or signal.

The output of the differentiating circuit 5 is supplied through a conductor 5A to a first comparator 7 and through a conductor 5B to an input 6A of a time variable filter 6 having a time variable filtering characteristic. The filter 6 functions to eliminate harmonic waves from the signal coming from the differentiating circuit 5 and performs simultaneously a weighted averaging operation. The weighted averaging operation provides a weighted average feed rate signal at a second filter output 6C. Additionally, the filter 6 calculates from the average feed rate signal a feed rate prognosis value that is expected to occur at the next sampling. The feed rate prognosis value or signal is supplied through a first filter output 6B to a second input of the first comparator 7. The other input of the first comparator 7 receives the output from the signal differentiating circuit 5 through the conductor 5A. The time variable filter 6 is an electronic low-pass filter, preferably a Bessel filter having a controllable time variable filtering or response characteristic. Such a filter is available as hardware or it is available as part of a microprocessor that is provided with a respective filter program.

The output signal, or rather the difference signal from the comparator 7, is supplied through a conductor 7A to an input 9A of the above mentioned fuzzy logic circuit 9. Such fuzzy logic circuits 9 are available for example from OMRON in the USA and from SIEMENS in Germany. This signal transmission becomes available each time a sampling takes place. The first comparator 7 compares the feed rate representing signal from the circuit 5 with the prognosis value from the filter 6 and the resulting difference value is processed by the fuzzy logic circuit 9 in accordance with the fuzzy logic rules which are stored in a memory of the fuzzy logic circuit 5 which provides a fuzzy prognosis, based on the difference value, regarding the type and size of a possible interference or disturbance in the feed rate values. The fuzzy logic circuit 9 further functions to derive an information regarding the certainty or probability of the presence of a measurement disturbance or interference. These terms are used synonymously herein. Based on this information the circuit 9 further produces a filter control signal that represents a filtering degree or factor for the time variable filter 6. This filter control signal appears at the output 9B of the circuit 9. The output 9B is connected through a conductor 9F to a control input 6D of the time variable filter 6. A further conductor 16B connects the conductor 9F and thus the output 9B from the circuit 9 to one input of a closed loop control circuit 16 to be described in more detail below. The filter control signal controls the time response characteristic of the time variable filter 6 based on the following table for the implementation of the fuzzy logic circuit.

| Fade Grade | Interference Certainty | | |
|---|---|---|---|
| Interference Size | big | mid-size | small |
| large | big | big | big |
| medium | big | mid-size | mid-size |
| small | mid-size | mid-size | small |

If a large filtering degree or factor means a correspondingly large influence on the time constant of the filter 6 so that at the respective sampling point of time the net feeder output signal is completely or substantially filtered out, whereby a modified prognosis value is produced as a future estimated value signal. On the other hand, if the value of the difference between the prognosis value and the net feeder output value at the time of sampling is small, the fuzzy logic circuit 9 produces a correspondingly smaller filter control signal in accordance with the fuzzy logic rules, whereby the time constant of the filter 6 is influenced to a correspondingly smaller degree.

No filter control signal is supplied to the filter 6 if the prognosis value and the net feeder or weight output signal at the time of sampling are equal to each other. On the other hand, in case of a large difference between the just mentioned two values, the time constant of the filter 6 is so influenced that it tends toward infinity, whereby the closed loop control circuit 16 receives the prognosis value ascertained at the preceding sampling point of time as an actual or measured signal value.

As a result, the prognosis value is converted into a value which at the time of the next following sampling, is free from any disturbance or interference. This so-called "cleared" value represents the estimated value and is supplied from the filter output 6C to the second comparator circuit 15.

The fuzzy logic circuit 9 which receives at its input 9A the differential signal value from the output 7A of the first comparator 7, is so constructed that is allocates these incoming signals to for example three sets referred to as fuzzy sets, namely "small", "medium", and "large". The fuzzy logic circuit 9 extracts from these sets the above mentioned filter control signal, the size of which will depend on the above mentioned allocation. If the difference value between the prognosis value and the output of the differentiating circuit 5, that appears at the input 9A of the fuzzy logic 9 is allocated to the set "large" a correspondingly large filter control signal will be provided, which controls the time response characteristic of the filter 6 in such a way that the filter provides at its output a quasi-prognosis signal constituting an estimation signal or value.

On the other hand, if the signal at the input 9A is allocated to the sets "small" and "medium" a filter control signal is produced that is composed of different proportions from the "large", "medium", and "small" set. The resulting filter control signal controls the time constant of the filter 6 in such a. manner that a new, modified estimation value is provided at the respective output. The most significant advantage of using the fuzzy logic circuit 9 is achieved when measurement interferences or disturbances are filtered out or screened out in the "small" and "medium" range of interferences or disturbances because the fuzzy logic circuit is capable of eliminating these disturbances by a respective control of the filter 6 in accordance with a certain degree of their occurrence probability.

The fuzzy logic circuit 9 is also equipped with a feed-back circuit 10A including a signal integrator 10. The input of the integrator 10 is connected to an output 9C of the fuzzy logic circuit 9. The output of the integrator is connected to an input 9D of the circuit 9. This feed-back circuit 10A assures a reliable information regarding the filter control signal, or rather regarding the size of the filter control signal when "medium" and "small" interferences or disturbances are involved. The output 9C provides a respective signal which corresponds to the signal variation of the determined filter control signals between two or more sampling points of time so that an integration takes place through the integrator 10 over these time periods, whereby the integrator 10 feeds a respective signal to the input 9D of the circuit 9. This feature of the invention ascertains the time period of an interference or disturbance and provides, or rather forms a value which leads to an increase in the certainty that a measuring disturbance is being ascertained. Where smaller disturbances or interferences prevail for a longer period of time, it is possible to make, after a defined time period, a conclusion that a measuring disturbance or measuring interference is present, whereby such conclusion is based on a probability that borders on certainty. As a result, the feedback 10A increases the certainty of a fuzzy logic evaluation in accordance with the degree of probability.

Especially, if the size of the difference values at the output of the first comparator 7 increases within a scanning or sampling cycle, the probability is increased that a measuring disturbance or interference is involved, so that the filter control signal increases the time constant of the filter 6 to such an extent that the following closed loop control circuit 16 operates temporarily, after a certain time period, with the prognosis value as the estimated value and with the actual measured signal value. Once the disturbance has attenuated, the filter 6 is returned into its normal state of operation to work with an estimated value which corresponds almost or substantially to the net feed values at the time of sampling.

The important feature of the fuzzy logic circuit 9 for ascertaining or producing the filter control signal is differential dosing scales is seen in that even for small disturbances or interferences always a certain proportion thereof is evaluated as a measuring disturbance, whereby measuring disturbances having a frequency within the range of noise can be taken into account by a suitable selection of the fuzzy logic allocating functions and rules.

Another advantage of the use of the fuzzy logic circuit 9 as taught herein is seen in that with an increasing difference between the prognosis value and the output signal of the differentiating circuit 5 at the time of sampling, the probability increases that a measuring disturbance is present from which the fuzzy logic circuit 9 forms a filter control signal for controlling the filter 6 in such a way that the certainty of a presence of a disturbance increases at the above mentioned difference increases. Further, the rise characteristic of the filter control signal can be adapted to the actual presence of a measuring disturbance or interference so that a very precise measuring result of the differential dosing scale is assured. This precision is even increased by taking into account the time characteristic of the disturbance through the integrator 10 of the feedback circuit 10A.

The estimated value output 6C of the filter 6 is connected to an indicator or display 13. The output 6C is further connected to one input of a second comparator 15, the other input of which is connected to a reference value source, such a an adjustable signal generator 14 forming a set point control for changing, for example, the intended feed rate. The fuzzy logic circuit 9 must distinguish between interferences and intended feed rate changes accomplished by adjusting the signal generator 14. A time circuit 17 described below is provided for this purpose. The second comparator 15 forms from the estimated signal value of the filter 6 and from the rated value from the signal generator 14 a second difference value that is supplied through a conductor 16A to one input of the closed loop control 16, the other input of which receives the filter control signal from the output 9B of the fuzzy logic circuit 9 through the conductors 9F and 16B. When, of if, the second comparator 15 produces a difference output signal on the conductor 16A, the control circuit 16 forms an output signal on the conductor 11A connected to a control input of the drive motor 11 for driving the dosing conveyor 2B. As a result, the feed advance rate is adjusted in response to the output of the closed loop control circuit 16.

The closed loop control circuit 16 just described forms a rated value/actual value closed loop control. Such control can be implemented for example, by a proportional control (P) circuit, or a proportional integrator (PI) circuit, or preferably a proportional integrator differentiator (PID) circuit. Such circuits as such are conventional. In order to assure the stability of the closed loop control circuit under all circumstances, one input of the control circuit 16 is connected to the filter control signal through conductor 16B so that the control parameters depend on the filter control signal, or rather on the size of that signal.

By supplying the signal from the output 6C of the filter 6 to the indicator or display 13, the feed rate of the differential dosing scale 1 can be directly indicated or displayed either as an analog or as a digital value if an A/D conversion is part of the display 13. Rather than indicating the feed rate, the feed quantity can also be indicated or displayed as a weight value. For this purpose, the indicator or display 13 would comprise a respective integrator.

In order to properly differentiate between changes in the rated value and measuring disturbances, the time circuit 17 is connected between the input 9E of the fuzzy logic circuit 9 and the output of the rated value signal generator 14. The time circuit 17 constitutes a simulation of the transient characteristic of the closed loop control 16.

The signal from the time circuit 17 at the input 9E of the fuzzy logic circuit 9 is combined by the fuzzy logic circuit 9 with the signal received at the input 9A from the output of the first comparator 7 at the time of a sampling. Thus, the fuzzy circuit 9 takes into account a rated value change from the signal generator 14 and the difference between the feed rate prognosis signal on the first filter output 6B and the output signal of the differentiating circuit 5 on the input 5A of the first comparator 7 at the time of sampling, for forming the filter control signal.

The circuit arrangement 4 is suitable for cooperation with all differential dosing scales. It is not significant that the dosing conveyor is a screw conveyor as shown. Rather, any other conventional conveyors may be used, such as vibratory conveyors, belt conveyors, and the like, whereby the respective electrical drive motor 11 is controlled in response to the output signal of the circuit 4 at the control input 11A of the motor 11 for controlling the feed rate or the feed quantity in a closed loop fashion.

FIG. 1 shows that the components of the evaluating and control circuit 4 form an integral unit, including the differentiating circuit 5, the time variable filter 6, the first comparator 7, the fuzzy logic circuit 9, the integrator 10, the second comparator 15, and the closed loop control 16. However, it is also possible to distribute these components, whereby some of these components may form part of a weighing computer that receives its inputs from the load cells 3 or these components may be part of another separate computer or central processing unit.

Further, it is possible to realize the functions of the various components as just enumerated, by programmable computer circuits, the software for which would correspond to the above described functions of the various circuit components, e.g. 5, 6, 7, 17, 9, 10, 15, and 16.

Figure 2:
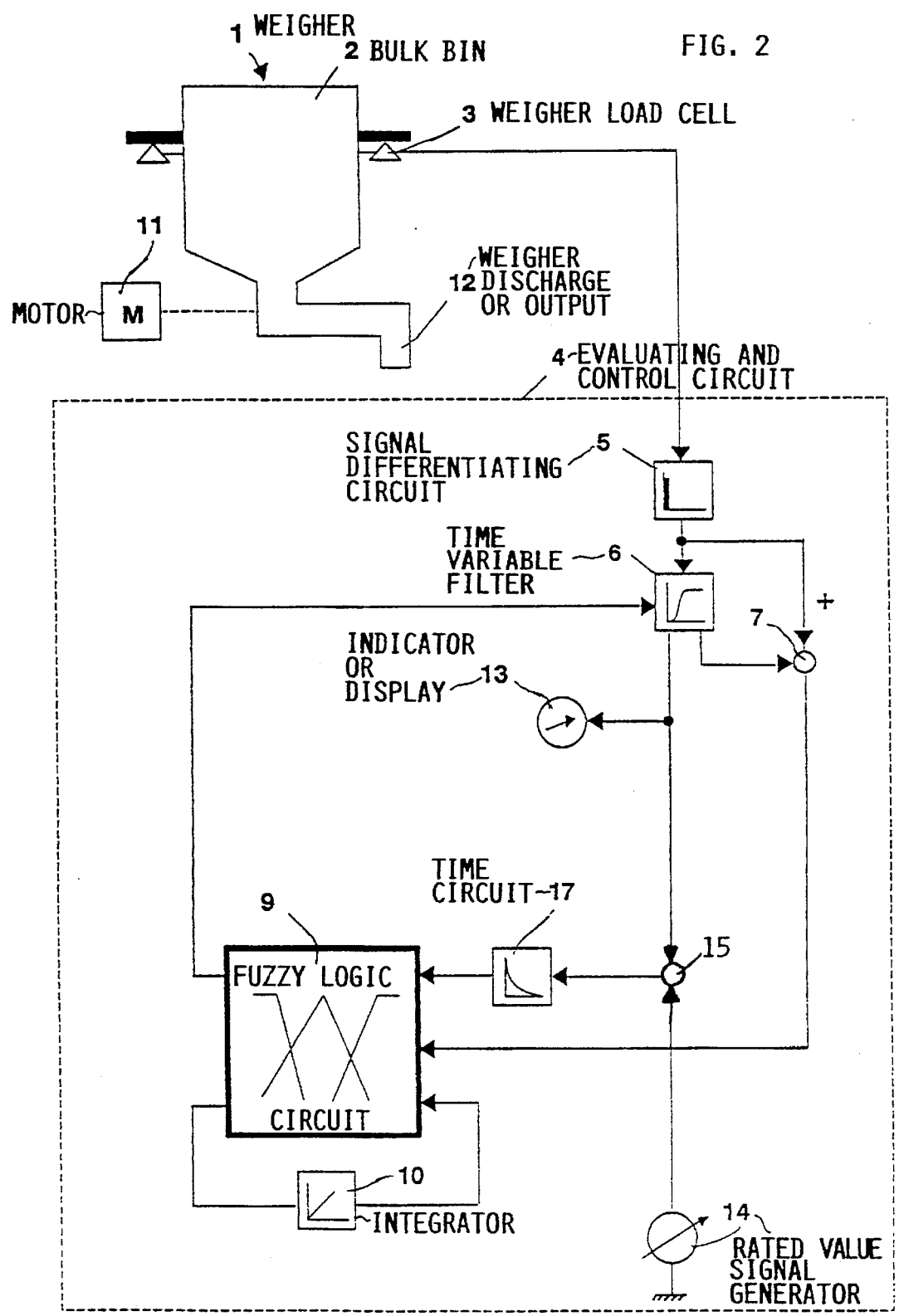
FIG. 2 is a signal evaluating circuit which provides an indication of the signal correction, but without the feedback closed loop control of FIG. 1.

A modified version of the evaluating circuit 4 may omit the closed loop control 16 for the motor 11 and provide merely the indicator or display 13 that shows the required information to an operator as illustrated in FIG. 2.

Figure 3:
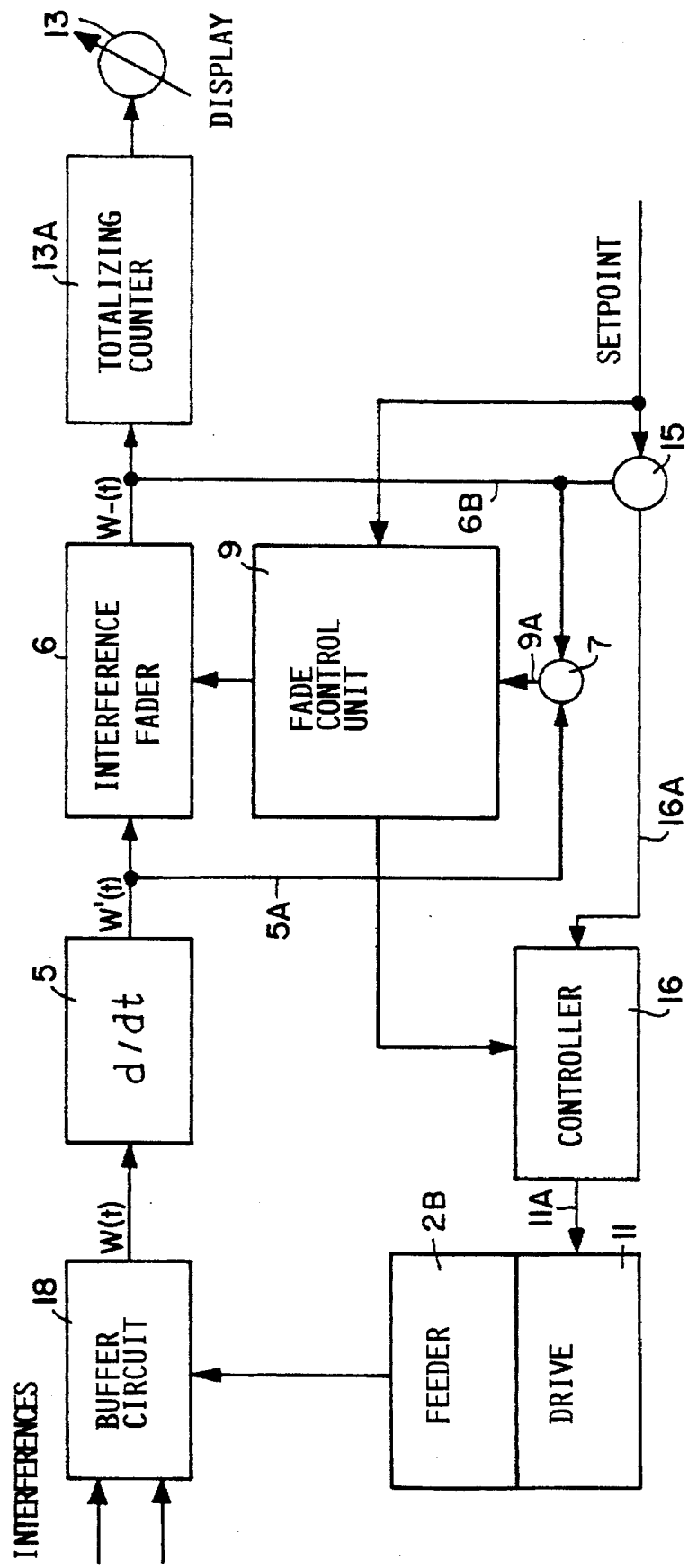
FIG. 3 is a block diagram similar to FIG. 1 illustrating the cooperation of the fuzzy logic circuit with the filter for varying the filter characteristic.

FIG. 3 illustrates in further detail the function of the circuit shown in FIG. 1, whereby the same components are provided with the same reference numbers in FIGS. 1 and 3. The time variable filter 6 used according to the invention functions as an interference fader having a time variable characteristic which is controlled by the filter control signal produced by the fuzzy logic circuit 9 functioning as a fade control unit. The signals measured by the weigher load cells 3 preferably pass through a buffer circuit 18 producing at its output a measured weight signal W(t) which is differentiated in the differentiating circuit 5 to provide a measured feed rate value W'(t) supplied to the interference fader or filter 6 which filters out unwanted interferences from the measured signal to provide a corrected feed rate W⁻(t) which is then used as the actual value of the feed rate for the fade control unit or fuzzy logic circuit 9 and for the display 13 that includes a totalizing counter 13A to provide actual weight values.

The corrected feed rate value W⁻(t) is supplied to a first input of the first comparator 7, which receives at its second input the measured feed rate value W'(t). The output of the first comparator 7 is connected to the fuzzy logic fade control unit 9 as in FIG. 1. The remainder of FIG. 3 corresponds substantially to FIG. 1. The low pass filter or interference fader 6 is controlled by the circuit 9 between a minimum time $T_o$ and a maximum time $T_g = m \times T_o$, wherein m is a factor. The filter 6 performs three functions. First, the measured values are smoothed. Therefore, the minimum time $T_o$ is determined by the noise level and the tolerance range. Second, unwanted interferences are suppressed by filtering out the interferences. Third, an estimated feed rate W⁻(t)=W⁻(t) is predicted and used to detect unwanted interferences.

Figure 4:
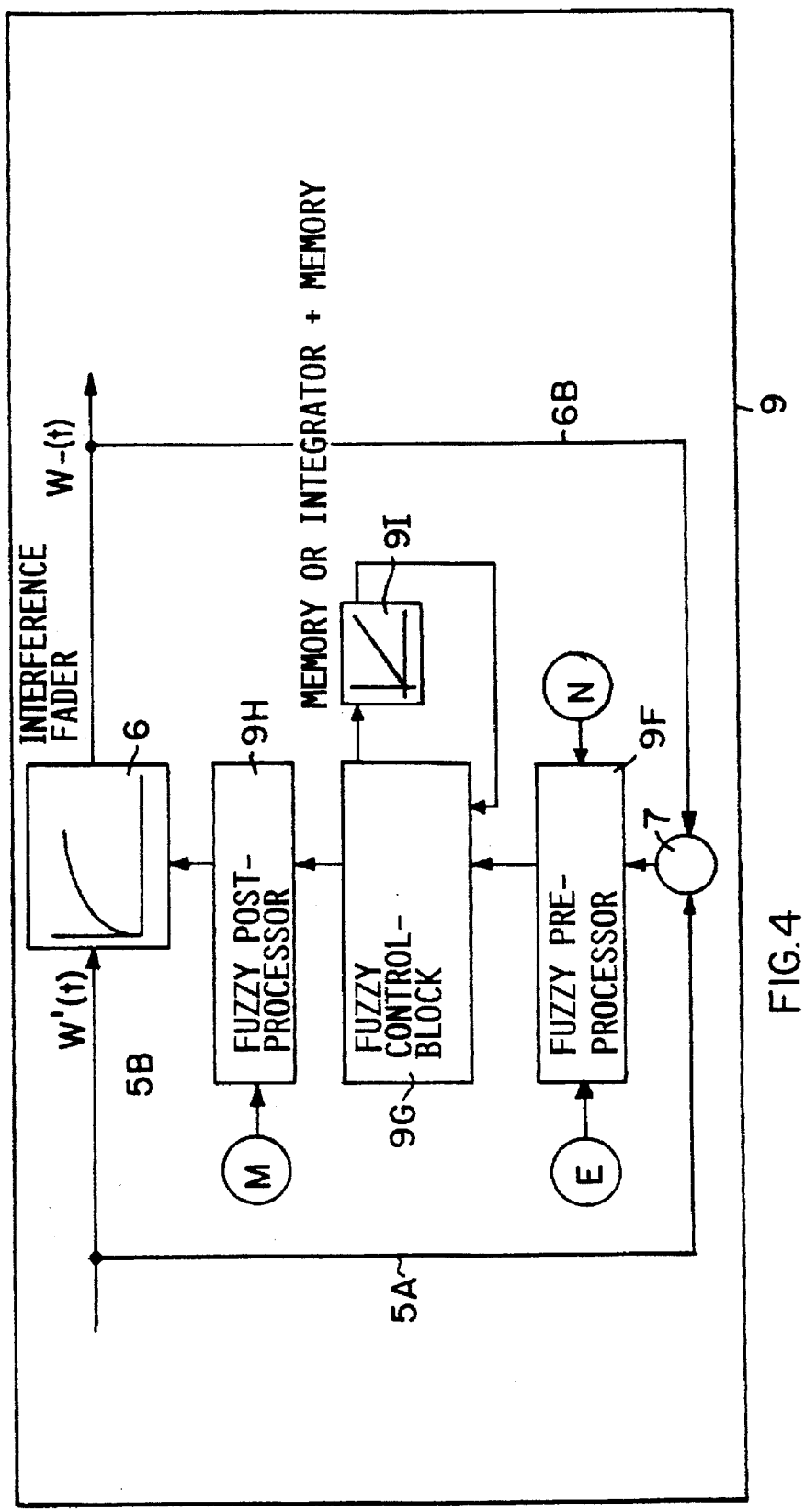
FIG. 4 is a block diagram of further details of the fuzzy logic circuit forming an interference fade control unit for the filter also referred to as an interference fader.

FIG. 4 shows further details of the fuzzy logic circuit of FIG. 3. The fuzzy logic circuit 9 includes a fuzzy preprocessor 9F, a fuzzy control block 9G, a fuzzy post processor 9H and a memory 9I. The fuzzy preprocessor 9F determines the characteristic of the fader or filter circuit 6 for small interferences. Input or parameter E determines the basic sensitivity of the fuzzy logic circuit 9 for small interferences. Interferences smaller than the limit or threshold set by the parameter E will not cause any action by the filter 6. Input or parameter N represents the sensitivity for medium interferences. The post processing block 9H limits the suppression of large interferences depending on a parameter M. Even for large interferences the time constant $T_g$ will not tend to infinity. Thus, the feedback control loop will never be open, whereby drift effects for long lasting interferences are prevented.

The fuzzy control block 9G has at its input a weighted deviation between an actual value of the feed rate and an estimation and produces at its output a fade grade. The memory 9I of the fuzzy logic circuit 9G assesses the development of the deviation over time. A mid-size interference would initially lead to a mid-size fading. If an interference of the same size lasts for a longer time, the fading will be intensified, because the certainty, that an unwanted interference has been detected, increases with time.

The rules which combine interference size and interference certainty to form the fade grade are given as an example for a rule-set in the above table.

Two additional functions have to be performed by the fuzzy fade control to assure proper functioning of the control loop. If a significant time constant in the control loop is altered by the interference fader, the controller parameters have to be adjusted. Set point changes have to be processed separately at the generator 14. This is done by an additional fuzzy block within block 9G which artificially reduces the deviation during the transitions following a set point change. A "set point change" refers to changing the rated output of the weigher or differential dosing scale.

The parameter setting is done at most in four steps: First, the basic time constant $T_o$ and controller parameters have to be set according to experience. Second, the basic sensitivity parameter E must be set according to the noise variance. Third, a default value is used for the sensitivity N for mid-size interferences, depending on the basic sensitivity E. This parameter N can, however, by adjusted by the operator. Fourth, the sensitivity M for large interferences, which determines the maximum time constant $T_g$ is provided as a default value, which can also be adjusted by the operator or service personnel.

Figure 5:
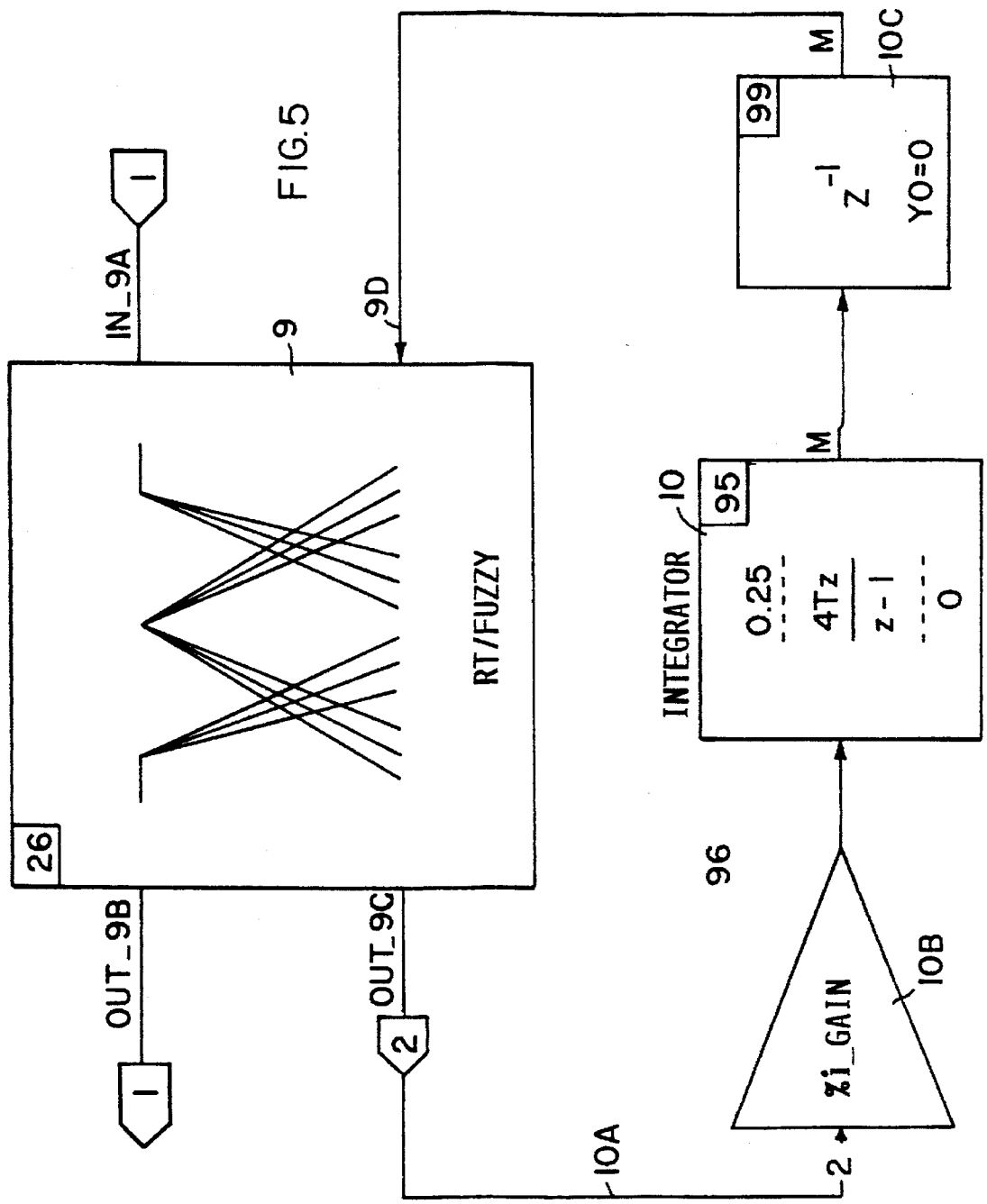
FIG. 5 shows further details of an integrator connecting an output of the fuzzy logic circuit to an input thereof to produce the parameter M.

FIG. 5 shows that an amplifier 10B is connected between the output 9C of the fuzzy logic circuit 9 and the input of the integrator 10. A time delay 10C is connected between the output of the integrator 10 and the input 9D of the circuit 9 to delay the signal that becomes the parameter M by one sampling interval. The sampling interval is from 0.000 for the first sample to 0.2500.

One example of a program sequence in autocode C (TM) language has been implemented as follows:

FUZZY KERN 1.C PROGRAM IN C LANGUAGE

```
#include <stdio.h>
#include <math.h>
#include "sa_system.h"
#include "sa_defn.h"
#include "sa_types.h"
#include "sa_math.h"
#include "sa_user.h"
#include "sa_utils.h"
#include "sa_time.h"
#include "sa_fuzzy.h"
/*** System Data ***/
#define SCEDULER_FREQ     4.00000
#define NTASKS            1
#define NUMIN             1
#define NUMOUT            2
enum TASK_STATE_TYPE { IDLE, RUNNING, BLOCKED, UNALLOCATED };
enum SUBSYSTEM_TYPE { CONTINUOUS, PERIODIC, ENABLED_PERIODIC, TRIGGERED ANT,
      TRIGGERED_ATR, TRIGGERED_SAF, NONE };
/* Work area side indices for subsystems. */
static RT_INTEGER             SSWORKSIDE        [NTASKS+1];
static RT_INTEGER             SSREADSIDE;
static RT_INTEGER             ERROR_FLAG        [NTASKS+1];
static RT_DURATION            SUBSYS_TIME       [NTASKS+1];
static enum TASK_STATE_TYPE   TASK_STATE        [NTASKS+1];
/*****************************************************************************/
/* Struct map                                                                */
/* ---                                                                       */
/* SYSTEM EXTERNAL INPUT:                                                    */
/* sys_extin                                                                 */
/* RT_FLOAT In_9A                                                            */
/*                                                                           */
/* SYSTEM EXTERNAL OUTPUT:                                                   */
/* subsys_1_out                                                              */
/* RT_FLOAT Out_9B                                                           */
/* RT_FLOAT Out_9C                                                           */
/*                                                                           */
/* subsys_1 EXTERNAL INPUT:                                                  */
/* sys_extin                                                                 */
/* RT_FLOAT IN_9A                                                            */
/*                                                                           */
/* subsys_1 EXTERNAL OUTPUT:                                                 */
/* subsys_1_out                                                              */
/* RT_FLOAT Out_9B                                                           */
/* RT_FLOAT Out_9C                                                           */
/*                                                                           */
/*****************************************************************************/
/******* Task's code. *******/
/******* Subsystem 1 *******/
/******* States type declaration. *****/
struct_Subsys_1_states {
RT_FLOAT fuzzy_kern_1_99_Sl;
RT_FLOAT Integrator_Sl;
```

FUZZY KERN 1.C PROGRAM IN C LANGUAGE

```c
};
void subsys_1(U, Y)
struct_Sys_ExtIn *U;
struct_Subsys_1_out *Y;
{
static RT_INTEGER iinfo[4] = {0,1,1,1};
static RT_INTEGER INTI = 1;
/***** States Array. *****/
static struct_Subsys_1_states ss_1_states[2];
/***** Current and Next States Pointers. *****/
static struct_Subsys_1_states *X = &ss_1_states[0];
static struct_Subsys_1_states *XD = &ss_1_states[1];
static struct_Subsys_1_states *XTMP;
const RT_DURATION TSAMP = 0.25;
/***** Parameters. *****/
static RT_FLOAT R_P[473] = {0.001, 0.001, 0.0, 0.0, 0.0, 0.0, 0.0, 0.0,
    0.0, 0.0, 0.0, 0.0, 1.0, 0.0, -1.0, 1.0, 0.0, 0.0, 1.0, 1.0, 0.0,
    0.0, -0.125, -1.25, 1.125, 1.25, 1.0, 1.0, 1.0, 1.0, 1.0, 1.0, 1.0,
    1.0, 1.0, 1.0, 11.0, 1.0, 0.0, 0.0, 0.0, 0.0, 0.0, 0.0, 0.0, 0.0,
    0.0, 0.0, 11.0, 0.0, 0.2, 0.4, 0.6, 0.8, 1.0, 0.8, 0.6, 0.4, 0.2,
    0.0, 11.0, 0.0, 0.0, 0.0, 0.0, 0.0, 0.0, 0.0, 0.25, 0.5, 0.75, 1.0, 1.0,
    11.0, 0.0, 1.0, 0.0, 0.0, 0.0, 0.0, 0.0, 0.0, 0.0, 0.0, 0.0, 11.0,
    0.0, 0.0, 0.0, 0.0, 0.0, 1.0, 0.0, 0.0, 0.0, 0.0, 0.0, 11.0, 0.0,
    0.0, 0.0, 0.0, 0.0, 0.0, 0.0, 0.0, 0.0, 1.0, 0.0, 11.0, 1.0, 1.0,
    0.75, 0.5, 1.25, 0.0, 0.0, 0.0, 0.0, 0.0, 0.0, 0.0, 11.0, 0.0, 0.0, 0.25,
    0.5, 0.75, 1.0, 0.75, 0.5, 1.25, 0.0, 0.0, 11.0, 0.0, 0.0, 0.0, 0.0,
    0.0, 0.0, 0.25, 0.5, 0.75, 1.0, 1.0, 11.0, 0.0, 0.0, 0.0, 0.0, 0.0,
    0.0, 0.0, 0.0, 0.0, 1.0, 0.0, 11.0, 0.0, 0.0, 0.0, 0.0, 0.0, 0.0,
    1.0, 0.0, 0.0, 0.0, 0.0, 11.0, 0.0, 1.0, 0.0, 0.0, 0.0, 0.0, 0.0,
    0.0, 0.0, 0.0, 0.0, 11.0, 0.0, 0.0, 0.0, 0.0, 0.0, 0.0, 0.25, 0.5,
    0.75, 1.0, 1.0, 11.0, 1.0, 1.0, 0.75, 0.5, 0.25, 0.0, 0.0, 0.0, 0.0,
    0.0, 0.0, 11.0, 0.0, 0.0, 0.25, 0.5, 0.75, 1.0, 0.75, 0.5, 0.25, 0.0,
    0.0, 11.0, 0.0, 0.0, 0.0, 0.0, 1.0, 0.0, 0.0, 0.0, 0.0, 0.0, 0.0,
    11.0, 0.0, 0.1, 0.2, 0.3, 0.4, 0.5, 0.6, 0.7, 0.8, 0.9, 1.0, 11.0,
    0.0, 0.2, 0.4, 0.6, 0.8, 1.0, 0.8, 0.6, 0.4, 0.2, 0.0, 11.0, 1.0,
    0.0, 0.0, 0.0, 0.0, 0.0, 0.0, 0.0, 0.0, 0.0, 0.0, 11.0, 0.0, 0.0,
    0.25, 0.5, 0.75, 1.0, 1.0, 1.0, 1.0, 1.0, 1.0, 11.0, 1.0, 1.0, 0.75,
    0.5, 0.25, 0.0, 0.0, 0.0, 0.0, 0.0, 0.0, 0.0, 11.0, 0.0, 0.0, 0.0, 0.0,
    0.0, 0.0, 0.25, 0.5, 0.75, 1.0, 1.0, 11.0, 0.0, 0.0, 0.0, 0.0, 0.0,
    0.0, 0.25, 0.5, 0.75, 1.0, 1.0, 11.0, 0.5, 0.5, 0.5, 0.5, 0.5, 0.5,
    0.5, 0.5, 0.5, 0.5, 0.5, 0.0, 0.01, 0.02, 0.03, 0.04, 0.05, 0.06,
    0.07, 0.08, 0.09, 0.1, 11.0, 0.6, 0.6, 0.6, 0.6, 0.6, 0.6, 0.6, 0.6,
    0.6, 0.6, 0.6, 0.0, 0.01, 0.02, 0.03, 0.04, 0.05, 0.06, 0.07, 0.08,
    0.09, 0.1, 11.0, 0.1, 0.1, 0.1, 0.1, 0.1, 0.1, 0.1, 0.1, 0.1, 0.1,
    0.1, 0.0, 0.01, 0.02, 0.03, 0.04, 0.05, 0.06, 0.07, 0.08, 0.09, 0.1,
    11.0, 0.9, 0.9, 0.9, 0.9, 0.9, 0.9, 0.9, 0.9, 0.9, 0.9, 0.9, 0.0,
    0.01, 0.02, 0.03, 0.04, 0.05, 0.06, 0.07, 0.08, 0.09, 0.1, 11.0, 0.1,
    0.1, 0.1, 0.1, 0.1, 0.1, 0.1, 0.1, 0.1, 0.1, 0.1, 0.0, 0.01, 0.02,
    0.03, 0.04, 0.05, 0.06, 0.07, 0.08, 0.09, 0.1, 11.0, 0.9, 0.9, 0.9,
    0.9, 0.9, 0.9, 0.9, 0.9, 0.9, 0.9, 0.9, 0.0, 0.01, 0.02, 0.03, 0.04,
    0.05, 0.06, 0.07, 0.08, 0.09, 0.1, 11.0, 0.4, 0.4, 0.4, 0.4, 0.4,
    0.4, 0.4, 0.4, 0.4, 0.4, 0.4, 0.0, 0.01, 0.02, 0.03, 0.04, 0.05,
    0.06, 0.07, 0.08, 0.09, 0.1};
/***** Local Block Outputs. *****/
RT_FLOAT M_1;
RT_FLOAT fuzzy_kern_1_96_1;
RT_FLOAT M_2;
/***** Algorithmic Local Variables. *****
RT_FLOAT INPVAL[2];
RT_FLOAT LOGVAL[6];
RT_FLOAT RULVAL[10];
RT_FLOAT CURVAL;
RT_INTEGER L_1;
RT_INTEGER I1;
RT_INTEGER NPTS;
RT_INTEGER IPTR;
RT_FLOAT WEIGHT;
RT_FLOAT CUTOFF;
RT_FLOAT TCURVE;
RT_FLOAT TDENOM;
RT_FLOAT xnew;
/***** Output Update. *****/
/* - - - Time Delay */
/* {fuzzy_kern_1..99} */
if (INIT) {
    X->fuzzy_kern_1_99_S1 = 0.0;
}
M_1 = X->fuzzy_kern_1_99_S1;
```

FUZZY KERN 1.C PROGRAM IN C LANGUAGE

```
/* - - - RT/Fuzzy */
/* {fuzzy_kern_1..26} */
INPVAL[0] = BOUND(U->In_9A,0.0,1.0);
INPVAL[1] = BOUND(M_1,0.0,1.0);
IPTR = {RT_INTEGER)(10.0*INPVAL[0]};
LOGVAL[0] = R_P[241+IPTR] + (R_P[242+IPTR] - R_P[241+IPTR])*(10.0*INPVAL[0
    ] - (RT_FLOAT)(IPTR));
IPTR = (RT_INTEGER)(10.0*INPVAL[0]);
LOGVAL[1] = R_P[253+IPTR] + (R_P[254+IPTR] - R_P[253+IPTR])*(10.0*INPVAL[0
    ] - (RT_FLOAT)(IPTR));
IPTR = (RT_INTEGER)(10.0*INPVAL[1]);
LOGVAL[2] = R_P[265+IPTR] + (R_P[266+IPTR] - R_P[265+IPTR])*(10.0*INPVAL[1
    ] - (RT_FLOAT)(IPTR));
IPTR = (RT_INTEGER)(10.0*INPVAL[1]);
LOGVAL[3] = R_P[277+IPTR] + (R_P[278+IPTR] - R_P[277+IPTR])*(10.0*INPVAL[1
    ] - (RT_FLOAT)(IPTR));
IPTR = (RT_INTEGER)(10.0*INPVAL[0]);
LOGVAL[4] = R_P[289+IPTR] + (R_P[290+IPTR] - R_P[289+IPTR])*(10.0*INPVAL[0
    ] - (RT_FLOAT)(IPTR));
IPTR = (RT_INTEGER)(10.0*INPVAL[1]);
LOGVAL[5] = R_P[301+IPTR] + (R_P[302+IPTR] - R_P[301+IPTR])*(10.0*INPVAL[1
    ] - (RT_FLOAT)(IPTR));
RULVAL[0] = LOGVAL[0];
RULVAL[1] = MIN(LOGVAL[1],LOGVAL[2]);
RULVAL[2] = LOGVAL[0];
RULVAL[3] = MIN(LOGVAL[1],LOGVAL[3]);
RULVAL[4] = MIN(LOGVAL[4],LOGVAL[2]);
RULVAL[5] = MIN(LOGVAL[4],LOGVAL[3]);
RULVAL[6] = MIN(LOGVAL[1],LOGVAL[3]);
RULVAL[7] = LOVAL[4];
RULVAL[8] = MIN(LOGVAL[5],LOGVAL[1]);
RULVAL[9] = LOGVAL[5];
TCURVE = 0.0;
TDENOM = 0.0;
if (RULVAL[0] > 0.0) {
  IPTR = (RT_INTEGER)(10.0*RULVAL[0]);
  WEIGHT = (R_P[324+IPTR] + (R_P[325+IPTR] - R_P[324+IPTR])*(10.0*RULVAL[0
      ] - (RT_FLOAT)(IPTR));
  CUTOFF = (R_P[313+IPTR] + (R_P[314+IPTR] - R_P[313+IPTR])*(10.0*RULVAL[0
      ] - (RT_FLOAT)(IPTR));
  TDENOM = TDENOM + WEIGHT;
  TCURVE = TCURVE + WEIGHT*CUTOFF;
}
if (RULVAL[1] > 0.0) {
  IPTR = (RT_INTEGER)(10.0*RULVAL[1]);
  WEIGHT = (R_P[324+IPTR] + (R_P[325+IPTR] - R_P[324+IPTR])*(10.0*RULVAL[1
      ] - (RT_FLOAT)(IPTR));
  CUTOFF = (R_P[313+IPTR] + (R_P[314+IPTR] - R_P[313+IPTR])*(10.0*RULVAL[1
      ] - (RT_FLOAT)(IPTR));
  TDENOM = TDENOM + WEIGHT;
  TCURVE = TCURVE + WEIGHT*CUTOFF;
}
if (RULVAL[6] > 0.0) {
  IPTR = (RT_INTEGER)(10.0*RULVAL[6]);
  WEIGHT = (R_P[416+IPTR] + (R_P[417+IPTR] - R_P[416+IPTR])*(10.0*RULVAL[6
      ] - (RT_FLOAT)(IPTR));
  CUTOFF = (R_P[405+IPTR] + (R_P[406+IPTR] - R_P[405+IPTR])*(10.0*RULVAL[6
      ] - (RT_FLOAT)(IPTR));
  TDENOM = TDENOM + WEIGHT;
  TCURVE = TCURVE + WEIGHT*CUTOFF;
}
if (RULVAL[7] > 0.0) {
  IPTR = (RT_INTEGER)(10.0*RULVAL[7]);
  WEIGHT = (R_P[439+IPTR] + (R_P[440+IPTR] - R_P[439+IPTR])*(10.0*RULVAL[7
      ] - (RT_FLOAT)(IPTR));
  CUTOFF = (R_P[428+IPTR] + (R_P[429+IPTR] - R_P[428+IPTR])*(10.0*RULVAL[7
      ] - (RT_FLOAT)(IPTR));
  TDENOM = TDENOM + WEIGHT;
  TCURVE = TCURVE + WEIGHT*CUTOFF;
}
if (RULVAL[9] > 0.0) {
  IPTR = (RT_INTEGER)(10.0*RULVAL[9]);
  WEIGHT = (R_P[439+IPTR] + (R_P[440+IPTR] - R_P[439+IPTR])*(10.0*RULVAL[9
      ] - (RT_FLOAT)(IPTR));
  CUTOFF = (R_P[428+IPTR] + (R_P[429+IPTR] - R_P[428+IPTR])*(10.0*RULVAL[9
      ] - (RT_FLOAT)(IPTR));
  TDENOM = TDENOM + WEIGHT;
  TCURVE = TCURVE + WEIGHT*CUTOFF;
```

FUZZY KERN 1.C PROGRAM IN C LANGUAGE

```
}
if (TDENOM <= 0.0) {
   Y->Out_9B = 0.0;
}
else {
   Y->Out_9B = BOUND(TCURVE/TDENOM,0.0,1.0);
}
Y->Out_9B = -0.125 + 1.25*Y->Out_9B;
TCRUVE = 0.0;
TDENOM = 0.0;
if (RULVAL[2] > 0.0) {
   IPTR = (RT_INTEGER)(10.0*RULVAL[2]);
   WEIGHT = (R_P[347+IPTR] + (R_P[348+IPTR] - R_P[347+IPTR])*(10.0*RULVAL[2
   ] - (RT_FLOAT)(IPTR));
   CUTOFF = (R_P[336+IPTR] + (R_P[337+IPTR] - R_P[336+IPTR])*(10.0*RULVAL[2
   ] - (RT_FLOAT)(IPTR));
   TDENOM = TDENOM + WEIGHT;
   TCURVE = TCURVE + WEIGHT*CUTOFF;
}
if (RULVAL[3] > 0.0) {
   IPTR = (RT_INTEGER)(10.0*RULVAL[3]);
   WEIGHT = (R_P[370+IPTR] + (R_P[371+IPTR] - R_P[370+IPTR])*(10.0*RULVAL[3
   ] - (RT_FLOAT)(IPTR));
   CUTOFF = (R_P[359+IPTR] + (R_P[360+IPTR] - R_P[359+IPTR])*(10.0*RULVAL[3
   ] - (RT_FLOAT)(IPTR));
   TDENOM = TDENOM + WEIGHT;
   TCURVE = TCURVE + WEIGHT*CUTOFF;
}
if (RULVAL[4] > 0.0) {
   IPTR = (RT_INTEGER)(10.0*RULVAL[4]);
   WEIGHT = (R_P[393+IPTR] + (R_P[394+IPTR] - R_P[393+IPTR])*(10.0*RULVAL[4
   ] - (RT_FLOAT)(IPTR));
   CUTOFF = (R_P[382+IPTR] + (R_P[383+IPTR] - R_P[382+IPTR])*(10.0*RULVAL[4
   ] - (RT_FLOAT)(IPTR));
   TDENOM = TDENOM + WEIGHT;
   TCURVE = TCURVE + WEIGHT*CUTOFF;
}
if (RULVAL[5] > 0.0) {
   IPTR = (RT_INTEGER)(10.0*RULVAL[5]);
   WEIGHT = (R_P[347+IPTR] + (R_P[348+IPTR] - R_P[347+IPTR])*(10.0*RULVAL[5
   ] - (RT_FLOAT)(IPTR));
   CUTOFF = (R_P[336+IPTR] + (R_P[337+IPTR] - R_P[363+IPTR])*(10.0*RULVAL[5
   ] - (RT_FLOAT)(IPTR));
   TDENOM = TDENOM + WEIGHT;
   TCURVE = TCURVE + WEIGHT*CUTOFF;
}
if (RULVAL[8] > 0.0) {
   IPTR = (RT_INTEGER)(10.0*RULVAL[8]);
   WEIGHT = (R_P[462+IPTR] + (R_P[463+IPTR] - R_P[462+IPTR])*(10.0*RULVAL[8
   ] - (RT_FLOAT)(IPTR));
   CUTOFF = (R_P[451+IPTR] + (R_P[452+IPTR] - R_P[451+IPTR])*(10.0*RULVAL[8
   ] - (RT_FLOAT)(IPTR));
   TDENOM = TDENOM + WEIGHT;
   TCURVE = TCURVE + WEIGHT*CUTOFF;
}
if (TDENOM <= 0.0) {
   Y->Out_9C = 0.0;
}
else {
   Y->Out_9C = BOUND(TCURVE/TDENOM,0.0,1.0);
}
Y->Out_9C = -1.25 + 2.5*Y->Out_9C;
/* - - - Gain Block */
/* {fuzzy_kern_1..96} */
fuzzy_kern_1_96_1 = Y->Out_9C;
/* - - - Limited Integrator */
/* {fuzzy_kern_1.Integrator.95} */
xnew = X->Integrator_S1 + TSAMP*fuzzy_kern_1_96_1;
if (fuzzy_kern_1_96_1 > 0.0) {
   if (xnew > 0.25) {
      xnew = 0.25;
   }
}
else if (fuzzy_kern_1_96_1 < 0.0) {
   if (xnew < 0.0) {
      xnew = 0.0;
   }
}
```

-continued

FUZZY KERN 1.C PROGRAM IN C LANGUAGE

```
M_2 = xnew;
M_2 = 4.0*M_2;
/***** State Update. *****/
/* - - - Time Delay */
/* (fuzzy_kern_1..99) */
XD->fuzzy_kern_1_99_S1 = M_2;
/* - - - Limited Integrator */
/* {fuzzy_kern_1.Integrator.95} *.
XD->Integrator_S1 = X->Integrator_S1 + TSAMP*fuzzy_kern_1_96_1;
if (fuzzy_kern_1_96_1 > 0.0) {
    if (XD->Integrator_S1 > 0.25) {
        XD->Integrator_S1 = 0.25;
    }
}
else if (fuzzy_kern_1_96_1 < 0.0) {
    if (XD->Integrator)S1 < 0.0) {
        XD->Integrator_S1 = 0.25;
    }
}
/***** Swap state pointers. *****/
XTMP = X;
X = XD;
XD = XTMP;
INIT = 0;
iinfo[1] = 0;
return;
ERROR: ERROR_FLAG[1] = iinfo[0];
iinfo[0]=0;
}
```

Compared to a conventional solution, the present invention has several advantages. First, the parameter adjustment is much less critical and thus easier. Second, the present solution is robust against environmental changes. Third, the control loop is never cut open. Fourth, interferences with a size below the former threshold are processed, even though they are not completely suppressed. Fifth, having no set threshold the process cannot be stuck around a set threshold, which can happen with all solutions that include switching. Sixth, the integral accuracy is maintained, and the fading has an average of zero.

Although the invention has been described with reference to specific example embodiments, it will be appreciated that it is intended to cover all modifications and equivalents within the scope of the appended claims.

What we claim is:

1. A method for filtering out measurement falsifying signal components from measured output signals of a differential dosing scale, comprising the following steps:
   (a) measuring scale output signals from said scale to provide values that include variations representing said measurement falsifying signal components,
   (b) processing said values in accordance with fuzzy logic rules by allocating different sizes of said values to sets of values representing the type and size of a disturbance or interference that causes said measurement falsifying signal components,
   (c) producing a filter control signal from said value sets,
   (d) passing said measurement falsifying signal components through a filter (6) having a controllable variable time response characteristic for filtering out said measurement falsifying signal components, and
   (e) controlling said variable time response characteristic of said filter (6) in response to said filter control signal for imposing a time variable filtering degree.

2. The method of claim 1, wherein said measuring of said scale output signals is performed continuously.

3. The method of claim 1, wherein said measuring of said scale output signals is performed at sampling intervals.

4. The method of claim 1, further comprising the following steps:
   (e) storing scale output signals that have been measured in the past as past scale output values,
   (f) producing a prognosis value from said past scale output values, and
   (g) comparing said prognosis value with a current scale output value at a sampling point of time to form a difference value the size of which corresponds to variations in said scale output values.

5. The method of claim 4, further comprising performing said processing step (b) by supplying said difference value to a fuzzy logic circuit (9) which first performs said allocating to fuzzy sets, "small", "medium", and "large", and further performing said step (c) of producing said filter control signal by processing said fuzzy sets in said fuzzy logic circuit (9) so that the size of said filter control signal corresponds to a measurement falsifying signal component of said scale output signal, whereby said filter control signal controls the time variable response characteristic of said filter for filtering out said measuring falsifying signal component.

6. The method of claim 5, further comprising recording or storing, as a function of time, past time dependent variations of said filter control signal, and taking recorded or stored time filter control signal variations into account for an evaluation of future difference values for increasing the certainty or probability that a measurement falsifying signal component is involved.

7. The method of claim 6, wherein said taking into account of said time dependent variations of said filter control signals is performed by integrating said variations during prior scanning or sampling periods, and combining respective integrated values with said difference value in accordance with said fuzzy logic rules during a current evaluation cycle.

8. The method of claim 1, further comprising generating a rated feed rate value at (14), comparing (at 15) said rated feed rate value with said actual scale output values for producing a correction signal representing a difference between said rated feed rate value and said actual scale output signals, processing said correction signal in accordance with said fuzzy logic rules for providing an improved correction signal and correcting said actual scale output signals with said improved correction signal in a closed loop control circuit to reduce said difference to zero so that said actual scale output values correspond to said rated feed rate values.

9. An apparatus for filtering out measurement falsifying signal components from actual measured scale output signals of a differential dosing scale, comprising a differential dosing scale including a feed drive and weight sensors (3) for measuring actual scale output signal variations to provide size variations representing values, and a signal evaluating and control circuit (4) for processing said size variations representing values, said control circuit comprising a differentiating circuit (5) having an input connected to said weight sensors through a conductor (3A) for producing an actual feed rate signal at an output (5A, 5B) of said differentiating circuit (5), a time variable filter (6) having a first input (6A) connected to said output (5B) of said differentiating circuit (5), said time variable filter (6) having a first output (6B) providing a future prognosis value and a second output (6C) providing a current estimated value, a first comparator circuit (7) having a first input connected to said output (5A) of said differentiating circuit (5) to receive said actual feed rate signal and a second input connected to said first output (6B) of said time variable filter (6) to receive said future prognosis value for producing a first difference value (at 7A) between said future prognosis value and said actual feed rate signal at a signal sampling time, said signal evaluating and control circuit (4) further comprising a fuzzy logic circuit (9) having a first input (9A) connected to an output (7A) of said first comparator circuit (7) for evaluating said first difference value for its size to provide size variations representing values and for allocating said size variations representing values to different value groups representing the type and size of a disturbance that causes said measurement falsifying signal components, said fuzzy logic circuit producing a filter control signal at its control output (9B) in response to said value groups, said time variable filter (6) having a second control input (6D) connected through a conductor (9F) to said control output (9B) of said fuzzy logic circuit (9) for controlling said time variable filter (6) to filter out said measurement falsifying signal components in response to said filter control signal so that said estimated value at said second output (6C) of said filter (6) is free of said falsifying signal components.

10. The apparatus of claim 9, wherein said signal evaluating and control circuit (4) comprises a feedback circuit (10, 10A) for said fuzzy logic circuit (9), said feedback circuit (10A) comprising an integrator (10) connected to a frequency output (9C) of said fuzzy logic circuit (9) and to a feedback input (9D) of said fuzzy logic circuit, said signal integrator (10) integrating said filter control signal as a function of time to produce an integrated filter control signal which is combined with said first difference value at the next following sampling point of time for evaluation in accordance with fuzzy logic rules in said fuzzy logic circuit to thereby increase a certainty or probability that a measurement falsifying or disturbing signal component is involved.

11. The apparatus of claim 9, further comprising a closed loop control circuit (16) for controlling said feed drive (11) of said differential dosing scale (1), said closed loop control circuit (16) comprising a second comparator (15), closed loop control element (16) connected to an output of said second comparator (15), a rated value source (14) connected to one input of said second comparator (15), said second output (6C) of said time variable filter (6) being connected to another input of said second comparator (15) so that said second comparator compares said estimated value with a rated value provided by said rated value source (14) for forming a feed drive control signal that is passed through said closed loop control element (16) to said feed drive (11) of said differential dosing scale (1) for controlling said feed drive (11) to compensate for feed rate variations in accordance with deviations between said estimated value and said rated value as modified by said fuzzy logic circuit (9) through said filter (6).

12. The apparatus of claim 11, further comprising a time element (17) connecting said rated value source (14) to an input (9E) of said fuzzy logic circuit for combining said rated value in response to a rated value change with said first difference value so as to avoid evaluating said rated value change as a measurement falsifying signal.

13. The apparatus of claim 9, wherein said signal evaluating and control circuit (4) further comprises a programmable computer circuit wherein each of said differentiating circuit (5), said time variable filter (6), said first comparator (7), a time element (17), said fuzzy logic circuit (9), an integrator (10), a second comparator (15), and a closed loop control circuit (16) comprises a respective software.

14. The apparatus of claim 9, wherein said time variable filter has a variable time constant which is varied in response to said filter control signal.

* * * * *

UNITED STATES PATENT AND TRADEMARK OFFICE
CERTIFICATE OF CORRECTION

PATENT NO. : 5,665,941
DATED : September 9, 1997
INVENTOR(S) : Wehhofer et al.

It is certified that error appears in the above-identified patent and that said Letters Patent is hereby corrected as shown below:

| | | |
|---|---|---|
| In the abstract, line 4: | | replace "disturbance" by --disturbances-- ; |
| Col. 2, | line 9: | replace "EPO 291,553" by --EPO 291,553 B1--; |
| Col. 8, | line 38: | replace "a" (first occurance) by --as--; |
| Col. 8, | line 50: | replace "of" by --or--; |
| following Col. 11 and 12, | | |
| | line 13: | replace "SCEDULER" by --SCHEDULER--; |
| following Col. 13 and 14, | | |
| | line 8: | replace "INTI" by --INIT--; |
| | line 26: | replace "1.25" by --0.25--; |
| | line 27: | replace "1.25" by --0.25--; |
| following Col. 15 and 16, | | |
| | line 8: | replace " = " by -- - --; |
| | line 11: | replace " = " by -- - --; |
| | line 14: | replace " = " by -- - --; |
| | line 17: | replace " = " by -- - --; |
| | line 20: | replace " = " by -- - --; |
| | line 23: | replace " = " by -- - --; |

UNITED STATES PATENT AND TRADEMARK OFFICE
CERTIFICATE OF CORRECTION

PATENT NO. : 5,665,941

DATED : September 9, 1997

INVENTOR(S) : Wehhofer et al.

It is certified that error appears in the above-identified patent and that said Letters Patent is hereby corrected as shown below:

following Col. 15 and 16,
- line 38: delete "(" (first occurrence);
- line 40: delete "(" (first occurrence);
- line 47: delete "(" (first occurrence);
- line 49: delete "(" (first occurrence);
- line 56: delete "(" (first occurrence);
- line 58: delete "(" (first occurrence);
- line 65: delete "(" (first occurrence);
- line 67: delete "(" (first occurrence);
- line 74: delete "(" (first occurrence);
- line 76: delete "(" (first occurrence);

following Col. 17 and 18,
- line 14: delete "(" (first occurrence);
- line 16: delete "(" (first occurrence);
- line 32: delete "(" (first occurrence);
- line 34: delete "(" (first occurrence);
- line 41: delete "(" (first occurrence);
- line 43: delete "(" (first occurrence);
- line 50: delete "(" (first occurrence);
- line 52: delete "(" (first occurrence);

line 23: delete "(" (first occurrence);
line 25: delete "(" (first occurrence);

Signed and Sealed this

Seventh Day of April, 1998

Attest:

BRUCE LEHMAN

*Attesting Officer*  *Commissioner of Patents and Trademarks*